(12) United States Patent
Lee et al.

(10) Patent No.: US 7,688,693 B2
(45) Date of Patent: *Mar. 30, 2010

(54) METHOD OF REPRODUCING WRITE PROTECTION INFORMATION FROM AN OPTICAL INFORMATION STORAGE MEDIUM

(75) Inventors: Kyung-geun Lee, Gyeonggi-do (KR); Jung-wan Ko, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 814 days.

This patent is subject to a terminal disclaimer.

(21) Appl. No.: 11/235,295

(22) Filed: Sep. 27, 2005

(65) Prior Publication Data

US 2006/0018220 A1    Jan. 26, 2006

Related U.S. Application Data

(62) Division of application No. 10/630,977, filed on Jul. 31, 2003, now abandoned.

(30) Foreign Application Priority Data

Aug. 17, 2002    (KR) ............... 2002-48706

(51) Int. Cl.
*G11B 20/10* (2006.01)
(52) U.S. Cl. .................. 369/47.14; 369/53.17
(58) Field of Classification Search .............. 369/47.14, 369/53.17, 275.3, 275.1; 714/710, 711, 769, 714/758
See application file for complete search history.

(56) References Cited

U.S. PATENT DOCUMENTS

| 5,271,018 A | 12/1993 | Chan |
| 5,339,319 A | 8/1994 | Yamane et al. |
| 6,243,796 B1 | 6/2001 | Otsuka |
| 6,351,447 B1 | 2/2002 | Takagi et al. |
| 6,400,665 B1 | 6/2002 | Hamada et al. |
| 6,418,100 B1 | 7/2002 | Park et al. |

(Continued)

FOREIGN PATENT DOCUMENTS

EP    0 464 811    1/1992

(Continued)

OTHER PUBLICATIONS

DRX-510 UL, High Performance External Dual RW DVD/CD Recorder for Microsoft Windows Operating Systems (Sony Electronics Inc. 2003).

(Continued)

*Primary Examiner*—Tan X Dinh
(74) *Attorney, Agent, or Firm*—NSIP Law (57) ABSTRACT

A method of reproducing data from an optical storage medium includes reproducing write protection information from the optical storage medium. The optical information storage medium includes a lead-in area, a user data zone in which user data is recorded, and a lead-out area. The write protection information is recorded in at least one of the lead-in area and the lead-out area, together with defect management information. The data is recorded and/or reproduced according to the defect management information and the write protection information. The write protection information indicates a size of a write protected area differentiated from a plurality of sizes of write protected areas of the optical information storage medium.

31 Claims, 4 Drawing Sheets

U.S. PATENT DOCUMENTS

| | | |
|---|---|---|
| 6,480,446 B1 | 11/2002 | Ko |
| 6,496,455 B1 | 12/2002 | Takagi et al. |
| 6,549,499 B2 | 4/2003 | Takagi et al. |
| 6,556,522 B1 | 4/2003 | Ko et al. |
| 6,560,177 B2 | 5/2003 | Ko et al. |
| 6,611,483 B1 | 8/2003 | Park et al. |
| 6,724,705 B1 | 4/2004 | Ko et al. |
| 6,765,853 B1 * | 7/2004 | Ko et al. .............. 369/53.21 |
| 6,862,256 B2 | 3/2005 | Lee et al. |
| 7,142,495 B2 * | 11/2006 | Lee et al. .............. 369/53.21 |
| 7,362,678 B2 * | 4/2008 | Ko et al. .............. 369/53.21 |
| 2002/0067673 A1 | 6/2002 | Ko et al. |
| 2002/0075792 A1 | 6/2002 | Ko et al. |
| 2002/0097665 A1 | 7/2002 | Ko et al. |
| 2002/0145966 A1 | 10/2002 | Hirotsune et al. |
| 2002/0176341 A1 | 11/2002 | Ko et al. |
| 2003/0072236 A1 | 4/2003 | Hirotsune et al. |
| 2003/0095480 A1 | 5/2003 | Ko et al. |
| 2003/0123348 A1 | 7/2003 | Ozaki |
| 2006/0018219 A1 | 1/2006 | Lee et al. |
| 2006/0018220 A1 | 1/2006 | Lee et al. |
| 2006/0198263 A1 | 9/2006 | Lee et al. |

FOREIGN PATENT DOCUMENTS

| | | |
|---|---|---|
| EP | 0 965 988 | 12/1999 |
| JP | 63-113868 | 5/1988 |
| JP | 06-131816 | 5/1994 |
| JP | 08-138322 | 5/1996 |
| JP | 2000-003562 | 1/2000 |
| JP | 2000-36161 | 2/2000 |
| JP | 2000-245727 * | 8/2000 |
| JP | 2001-331945 | 11/2001 |
| KR | 2000-5588 | 1/2000 |
| KR | 2000-31791 | 6/2000 |
| KR | 2000-33180 | 6/2000 |
| WO | WO 00/31737 | 6/2000 |

OTHER PUBLICATIONS

DRU-510A High Performance Dual RW DVD/CD Recorder for Microsoft Windows 98SE, Windows Millennium Edition, Windows 2000, and Windows XP Operating Systems (Sony Electronics Inc. 2003).

U.S. Appl. No. 10/630,834, Filed Jul. 31, 2003, Kyung-geun Lee, et al.

U.S. Appl. No. 10/630,922, Filed Jul. 31, 2003, Kyung-geun Lee, et al.

U.S. Appl. No. 10/630,977, Filed Jul. 31, 2006, Lee et al., Samsung Electronics Co., Ltd.

U.S. Appl. No. 11/235,294, Filed Sep. 27, 2005, Lee et al., Samsung Electronics Co., Ltd.

U.S. Appl. No. 11/429,337, Filed May 8, 2006, Lee et al., Samsung Electronics Co., Ltd.

U.S. Appl. No. 11/756,153, Filed May 31, 2007, Kyung-geun Lee et al., Samsung Electronics Co., Ltd.

Office Action issued by Canadian intellectual Property Office in Canadian Patent Application No. 2,4194,070 on May 29. 2007.

Search Report issued Jun. 21, 2007 by the European Patent Office for European Patent Application No. 03710488.2.

* cited by examiner

| BYTE NO | CONTENTS | THE NUMBER OF BYTES |
|---|---|---|
| 0~(N−1) | ... | - |
| N | WRITE PROTECTION INFORMATION AND DEFECT MANAGEMENT INFORMATION | 1 |
| (N+1)−M | ... | - |

FIG. 3

METHOD OF REPRODUCING WRITE PROTECTION INFORMATION FROM AN OPTICAL INFORMATION STORAGE MEDIUM

CROSS-REFERENCE TO RELATED APPLICATIONS

This application is a divisional of U.S. patent application Ser. No. 10/630,977, filed Jul. 31, 2003, now abandoned, which claims the priority of Korean Patent Application No. 2002-48706, filed on Aug. 17, 2002, in the Korean Intellectual Property Office, the disclosures of which are incorporated herein in their entirety by reference.

BACKGROUND OF THE INVENTION

1. Field of the Invention

The present invention relates to an optical information storage medium and a method of recording information thereon, and more particularly, to an optical information storage medium on which write protection information and defect management information are recorded, and a method of recording such information thereon.

2. Description of the Related Art

Optical discs are generally used as information storage media of optical pickup devices which record information on and/or reproduce information from the optical discs without contacting the optical discs. Optical discs are classified as either compact discs (CDs) or digital versatile discs (DVDs) according to their information recording capacity. CDs and DVDs further include CD-Rs, CD-RWs, DVD+RWs, DVD-random access memories (DVD-RAMs), DVD-R/rewritables (DVD-RWs), and so forth. Furthermore, high-density digital versatile discs (HD-DVD) having a recording capacity of 20 GB or more have been developed.

When a user uses such an optical disc, the user may desire not to record supplemental information on the optical disc any more, depending on the intended use of the optical disc. For example, when the user desires to only reproduce data recorded as archived files, additional data must be prevented from being recorded on the optical disc. For this, the need for recording write protection information has been raised and write protection information has been already recorded on DVD-RAM/R/RWs. However, even when the optical disc is write-protected, a portion of the optical disc should be recordable, if necessary. For example, even if the optical disc is write-protected, data should be able to be recorded in an area such as a spare area so that a defect area can be replaced with the spare area in order to manage defects, and as such, the write protection information and the defect management information should be able to be recorded on the optical disc, too.

SUMMARY OF THE INVENTION

The present invention provides an optical information storage medium on which defect management information necessary for indicating whether defect management is permitted is recorded when write protection information is recorded, and a method of recording information thereon.

Additional aspects and advantages of the invention will be set forth in part in the description which follows and, in part, will be obvious from the description, or may be learned by practice of the invention.

According to an aspect of the present invention, there is provided an optical information storage medium including a lead-in area, a data zone in which user data is recorded, and a lead-out area. Here, write protection information is recorded along with defect management information in at least one of the lead-in area and lead-out area.

The data zone includes an inner spare area and an outer spare area, which are to replace a defect area, and a user data area in which the user data is recorded, and if the defect area can be managed, the user data area is write-protected. A drive test zone and a disc identification zone included in at least one of the lead-in area and the lead-out area, and the inner spare area and/or the outer spare area are recordable.

If the defect area cannot be managed, the user data area and a defect management zone included in at least one of the lead-in area and the lead-out area are write-protected. A drive test zone included in at least one of the lead-in area and the lead-out area and a disc identification zone which is included in at least one of the lead-in area and the lead-out area and in which the write protection information is recorded are recordable.

According to another aspect of the present invention, there is provided an optical storage medium comprising: a lead-in area; a data zone in which user data is recorded; and a lead-out area, wherein a write protection information is recorded to indicate one of and differentiate between a plurality of write protection statuses of the optical storage medium, each one of the plurality of write protection statuses indicating a size of a corresponding write protected area of the optical storage medium.

According to another aspect of the present invention, there is provided a method of recording information on and/or reproducing information from an optical information storage medium including a lead-in area, a user data zone in which user data is recorded, and a lead-out area. Write protection information is recorded. Defect management information necessary for indicating whether a defect area occurring when reproducing data can be managed is recorded.

According to another aspect of the present invention, there is provided a method of recording information on and/or reproducing information from an optical storage medium including a lead-in area, a data zone in which user data is recorded, and a lead-out area, the method comprising: recording write protection information which indicates one of and differentiates between a plurality of write protection statuses of the optical storage medium, one of the statuses being to allow defect management of a write protected optical storage medium.

According to another aspect of the present invention, there is provided an apparatus for recording data on and/or reproducing data from an optical storage medium, the apparatus comprising: a pickup to record data on and/or reproduce data from the optical storage medium; a system controller that records write protection information for indicating one of and differentiating between a plurality of write protection statuses of the optical storage medium, each one of the plurality of write protection statuses indicating a size of a corresponding write protected area.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
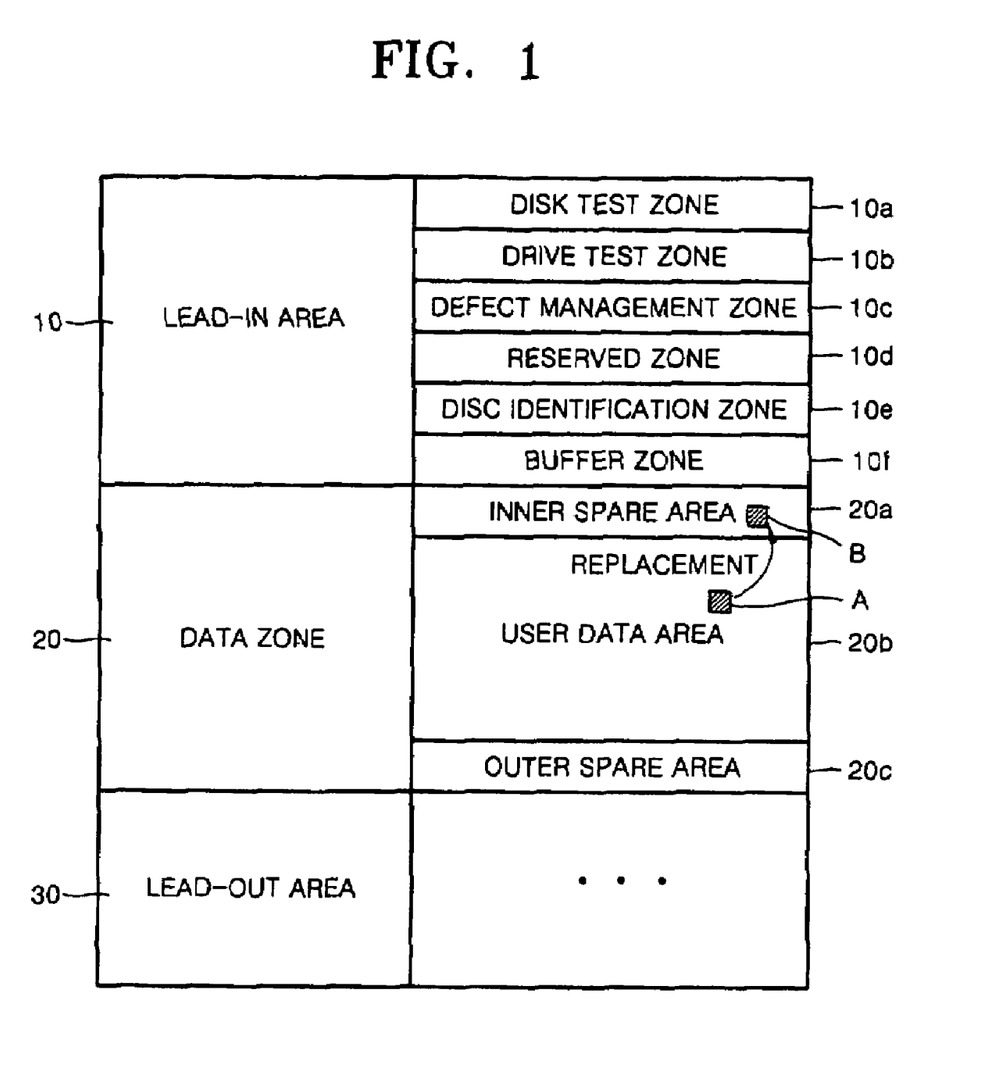
FIG. 1 illustrates the structure of an optical information storage medium according to an embodiment of the present invention.

FIG. 1 illustrates the schematic structure of an optical information storage medium (a disc) including a lead-in area 10, a data zone 20 in which user data is recorded, and a lead-out area 30. The lead-in area 10 may include a disc test zone 10a, a drive test zone 10b, a defect management zone 10c, a disc identification zone 10e, and a buffer zone 10f. The lead-in area 10 may further include at least one reserved zone 10d in which other pieces of information can be recorded.

Disc control information or information on the state of the disc can be generally recorded in the disc identification zone 10e. In the present invention, write protection information and defect management information can be recorded in the disc identification zone 10e. The disc identification zone 10e can also be called a "disc-related information zone" or a "disc control zone" according to various formats. The lead-out area 30 has a similar structure to the lead-in area 10, and thus will not be described herein.

The data zone 20 includes an inner spare area 20a and an outer spare area 20c, which are to be replaced with a defect area, and a user data area 20b in which user data is recorded. If the user data area 20b has a defect area, data recorded in the defect area is copied into the inner spare area 20a and/or the outer spare area 20c. In other words, if a defect area A appears when reproducing data recorded in the user data area 20b, the defect area A may be replaced with a predetermined area B of the inner spare area 20a.

Meanwhile, information on the defect area and information on the inner spare area 20a or the outer spare area 20c with which the defect area has been replaced can be recorded in the defect management zone 10c. Further, data can be reliably recorded and/or reproduced by managing the defect area. The information recorded in the defect management zone 10c may be, for example, position information on the defect area and the area with which the defect area has been replaced.

Figure 2:
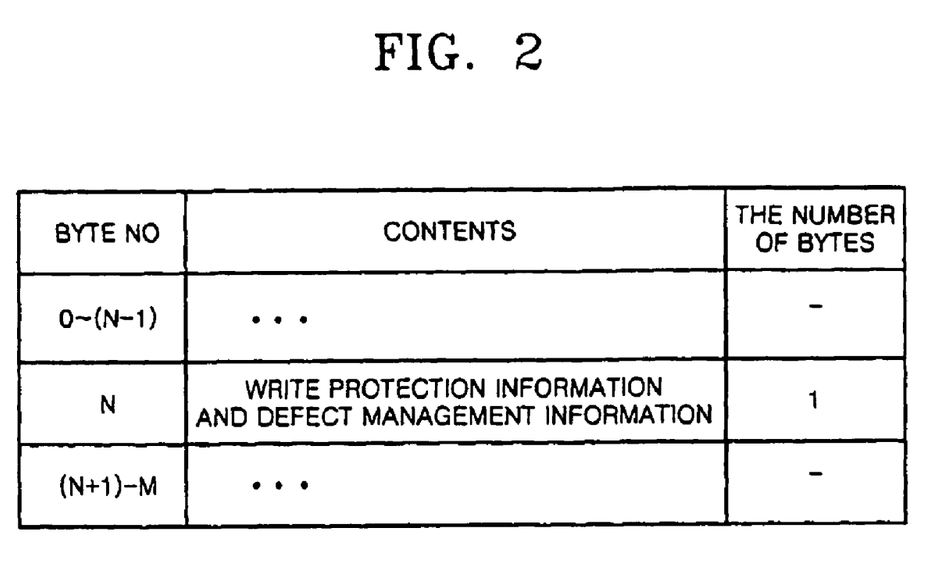
FIG. 2 is a view for explaining a method of recording write protection information on an optical information storage medium according to an embodiment of the present invention.

FIG. 2 illustrates write protection information recorded in a byte in a predetermined error correcting code (ECC) block of the disc identification zone 10e. Here, the following information can be recorded according to bit values.

TABLE 1

| Byte | Contents |
|---|---|
| 00000000b | Normal recording |
| 00000001b | Write protection information for (permanently) write-protecting all areas |
| 00000010b | Write protection information permitting defect management |
| 00000011b | Write protection information not permitting defect management |

In Table 1, "normal recording" indicates that data can be recorded, erased, and reproduced. "Write protection information for write-protecting all areas" indicates that data must not be recorded in all areas any more, i.e., all areas are permanently write-protected. In this case, additional defect management is not necessary and the write protection information cannot be amended.

"Write protection information permitting defect management" indicates that defects occurring when recording or reproducing data can be managed. Here, since information about the defect area has to be recorded to manage the defects, the defect management zone 10c of the lead-in area 10 should be recordable. Also, since data recorded in the defect area has to be copied into a spare area (e.g., the inner space area 20a or the outer space area 20b) so that the spare area replaces the defect area, the inner spare area 20a and the outer spare area 20c have to be recordable. The drive test zone 10b and the disc identification zone 10e also have to be recordable. Write protection information and defect management information is recorded in the disc identification zone 10e. Here, the write protection information may be selectively recorded by a user. In other words, the user can first record write protection information indicating that the disc is write protected in the disc identification zone 10e. Later, the user can record information indicating that the disc is recordable in the disc identification zone 10e. Thus, it is preferable that the disc identification zone 10e is recordable so that the write protection information can be updated. As described above, in an event that the write protection information permitting defect management is recorded, only the user data area 20b is write-protected.

"Write protection information not permitting defect management" indicates that defects occurring when recording or reproducing data cannot be managed. In this case, all areas are write-protected except the drive test zone 10b and the disc identification zone 10e. In other words, since the defects cannot be managed, the defect management zone 10c, the inner spare area 20a, the outer spare area 20c, and the user data area 20b are write-protected. Here, even if the defects cannot be managed, it is preferable that the drive test zone 10b is recordable to reproduce data and the disc identification zone 10e is recordable to update the write protection information and the defect management information.

As shown in FIG. 2, in an embodiment of the present invention, the write protection information is recorded in a byte in the disc identification zone 10e, i.e., in an N byte. However, the write protection information may be recorded in a plurality of bytes. Here, the write protection information and the defect management information can be recorded by a combination of bits in a predetermined byte. Alternatively, the write protection information and the defect management information may be recorded in separate bytes. In other words, the write protection information may be recorded in the N byte and the defect management information may be recorded in an (N+1) byte.

In an embodiment of the present invention, the write protection information and the defect management information can be recorded in at least one of the lead-in area 10 and the lead-out area 30. However, since the write protection information and the defect management information recorded in the lead-in area 10 or the lead-out area 30 may be damaged, the write protection information and the defect management information may be recorded in both the lead-in area 10 and the lead-out area 30.

In a method of recording information on an optical information storage medium according to an embodiment of the present invention, write protection information can be recorded in at least one of the lead-in area 10 and the lead-out area 30, along with defect management information necessary for indicating whether a defect area occurring when recording or reproducing data can be managed. The write protection information and the defect management information can be, for example, recorded in the disc identification zone 10e. As an example, the write protection is recorded to indicate one of a plurality of write protection statuses of the optical storage medium, and the write protection information may include information with regard to whether to allow defect management of the write protected optical storage medium.

If the defect management information indicates that the defect area can be managed, the drive test zone 10b, the defect management zone 10c, the inner spare area 20a, and the outer spare area 20c are recordable, and only the user data area 20b is write-protected. If the defect management information indicates that the defect area cannot be managed, the defect management zone 10c, the inner spare area 20a, the outer spare area 20c, and the user data area 20b are write-protected.

Figure 3:
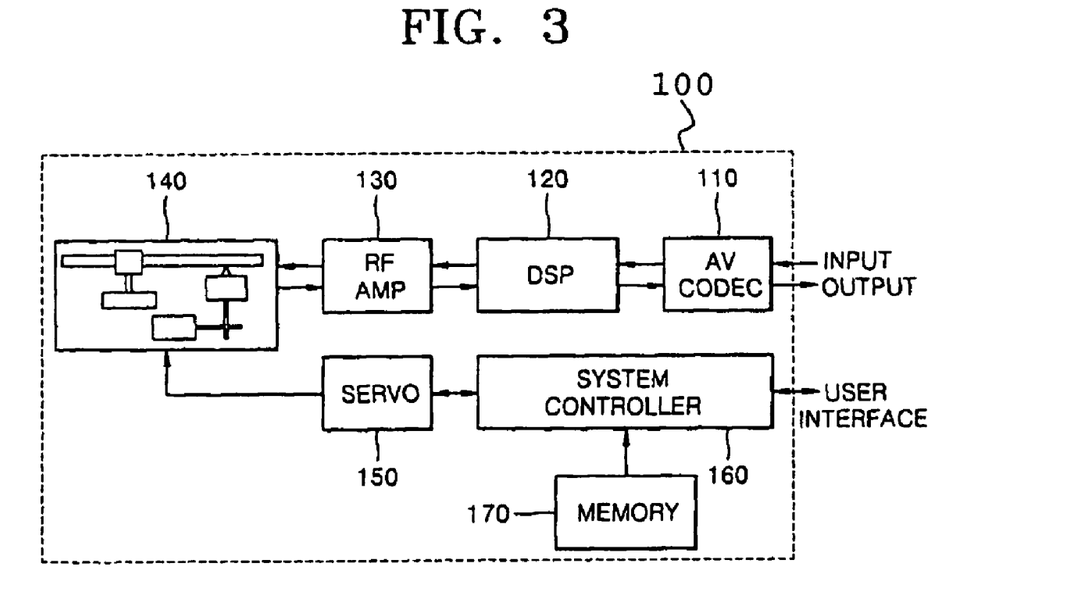
FIG. 3 is a block diagram of an apparatus for recording data and/or reproducing data from an optical information storage medium according to an embodiment of the present invention.

FIG. 3 is a block diagram of an apparatus 100 for recording data and/or reproducing data from an optical information storage medium according to the present invention. During recording, an AV codec 110 compression-codes an externally applied AV signal according to a predetermined compression scheme and supplies size information for the compressed data. A digital signal processor (DSP) 120 receives the compressed A/V data supplied from the AV codec 110, adds additional data for error correction code (ECC) processing thereto, and performs modulation using a predetermined modulation scheme. A radio frequency amplifier (RF AMP) 130 converts the modulated data from the DSP 120 into a radio frequency (RF) signal. Then, a pickup 140 records the RF signal supplied from the RF AMP 130 on a disc mounted on a turntable of the pickup 140. A servo 150 receives information necessary for servo control from a system controller 160 and stably performs a servo function for the mounted disc.

During playback of information data stored on the disc, the pickup 140 picks up an optical signal from the disc having the information data stored therein, and the information data is extracted from the optical signal. The RF AMP 130 converts the optical signal into an RF signal, and extracts a servo signal, for performing a servo function, and modulated data. The DSP 120 demodulates the modulated data supplied from the RF AMP 130 corresponding to the modulation scheme used during modulation, performs an ECC process to correct errors, and eliminates added data. The servo unit 150 receives information necessary for servo control from the RF AMP 130 and the system controller 160, and stably performs the servo function. The AV codec 110 decodes the compressed A/V data supplied from the DSP 120 to output an A/V signal. The system controller 160 controls the overall system for recording the information data on and reproducing the information data from the disc mounted on the turntable of the pickup 140.

Thus, the data recording and/or reproducing apparatus 100 can record the various types of information on the disc as described with reference to FIGS. 1 and 2, and/or reproduce the various types of information from the disc.

Figure 4:
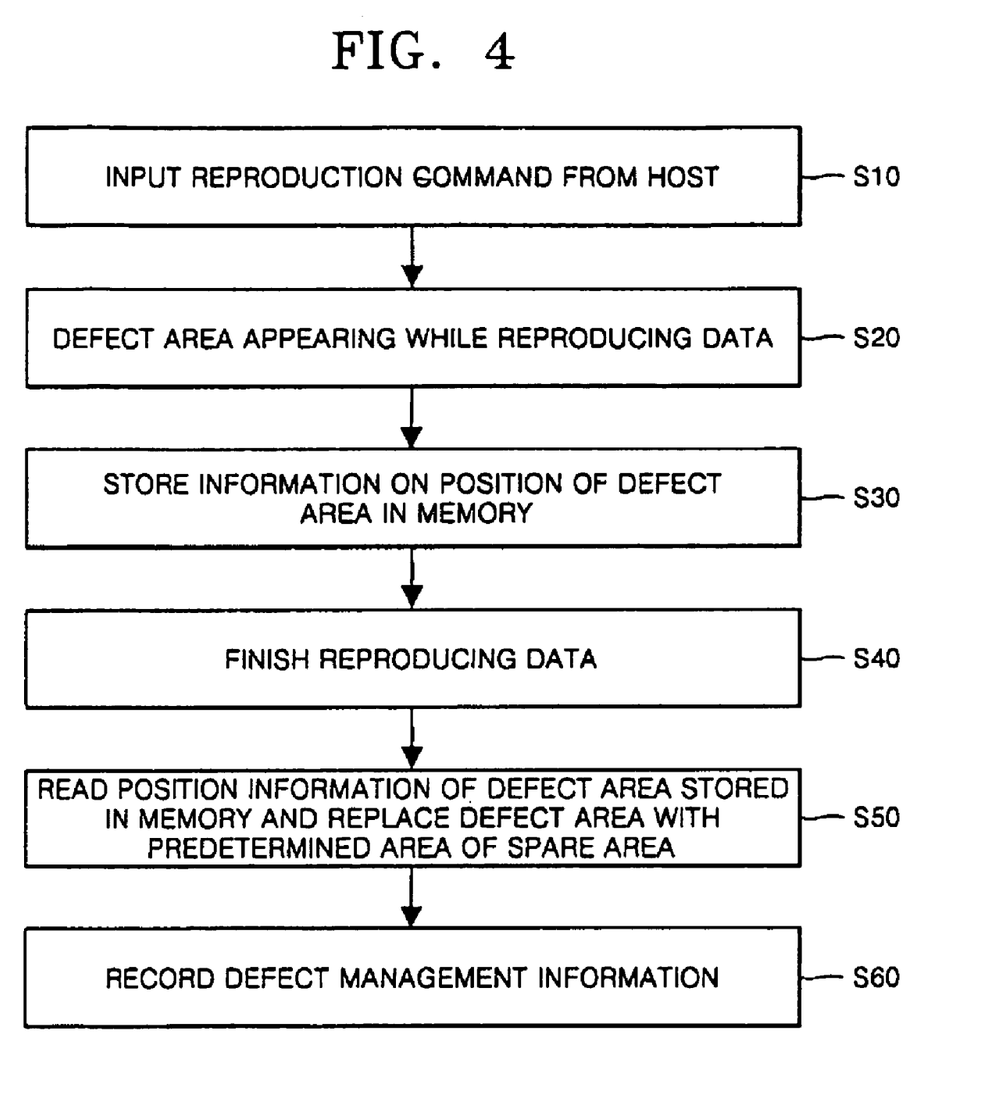
FIG. 4 is a flowchart for explaining a method of recording data and/or reproducing data from an optical information storage medium according to an embodiment of the present invention.

FIG. 4 is a flowchart for explaining a process of performing a data recording and/or reproducing method using the data recording and/or reproducing apparatus having the above-described structure, according to an embodiment of the present invention. In operation S10, a drive searches a disc for a physical address corresponding to a logical address requested by a host according to a reproduction command input from the host to reproduce data. Here, the drive corrects errors while reproducing data on an ECC block-by-block basis. Thus, if a defect or an error cannot be eliminated or corrected, the drive cannot reproduce data recorded in a block having the defect or the error. However, if the defect or the error in the block can be corrected by an ECC process, data can reproduced. Here, defects satisfying preset defect correction requirements can be corrected and managed. Thus, if an error-correctable defect occurs during reproduction of data in operation S20, in operation S30, information on the position of a defect area is stored in a memory 170 built in the system controller 160.

For example, referring to FIG. 1, if a defect appears in a fifth block when the drive reproduces data, information necessary for indicating that the fifth block is the defect area A is stored in the memory 170. Thereafter, in operation 40, the drive finishes reproducing information and the host does not give a reproduction command any more, i.e., the drive goes from a reproduction mode to a standby mode or the information storage medium is unloaded out of the drive. In operation 50, the position information of the defect area A stored in the memory 170 is read and data recorded in the defect area A (the fifth block) is copied into the predetermined area B of the inner spare area 20a or the outer spare area 20c, which is to replace the defect area A, while being reproduced. In operation 60, information on the positions of the defect area A and the predetermined area B are recorded as defect management information in the defect management zone 10c.

As described above, data of the defect area A copied into the predetermined area B can be reproduced using defect management information when reproducing the data recorded in the defect area A. In other words, by recording defect management information, data can be reliably reproduced by managing defects even if write protection information is recorded.

Figure 5:
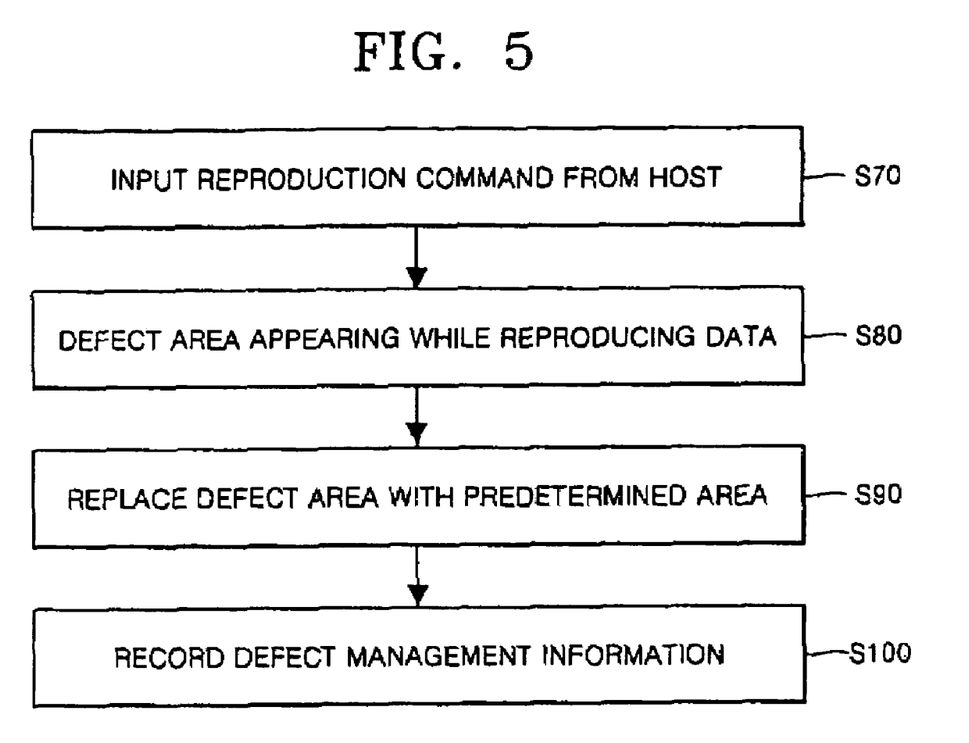
FIG. 5 is a flowchart for explaining a method of recording data and/or reproducing data from an optical information storage medium according to another embodiment of the present invention.

FIG. 5 is a flowchart for explaining a process of performing a data recording and/or reproducing method using the data recording and/or reproducing apparatus 100 having the above-described structure, according to another embodiment of the present invention. Referring to FIG. 5, in operations 70 and 80, a defect area appears when reproducing data according to a reproduction command input from a host. In operation 90, the defect area is replaced with a predetermined area of the inner spare area 20a or the outer spare area 20c. In operation 100, information on the positions of the defect area and the replaced area are recorded as defect management information in the defect management zone 10c. In the present embodiment, if a defect area appears, the defect area is immediately replaced with a predetermined area and information on the positions of the defect area and the predetermined area is recorded. Thus, an auxiliary memory is not necessary. The data recording and/or reproducing method described in the present embodiment can be performed when a recording and/or reproduction speed is faster than a speed demanded by a host.

Even when an information storage medium is write-protected, defects can be managed according to the above-described embodiments of the present invention.

While not required in all aspects, it is understood that the system controller 160 can be computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the pickup 140 could include a low wavelength, high numerical aperture type unit usable to record dozens of gigabytes of data on the disc. Examples of such units include, but are not limited to, those units using light wavelengths of 405 nm and having numerical apertures of 0.85, those units compatible with Blu-ray discs, and/or those units compatible with Advanced Optical Discs (AODs).

As described above, in an optical information storage medium and a method of recording information thereon according to the present invention, write protection information can be recorded together with defect management information necessary for indicating whether defects occurring when reproducing data can be managed. Even if the information storage medium is write-protected, the defects can be selectively managed using the defect management information. Thus, the write protection information indicates a size of a write protected area differentiated from a plurality of sized of write protected areas, wherein one of the statuses allows defect management of the write protected optical information storage medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing data from an optical storage medium, the method comprising:
   reproducing write protection information from a lead-in area of the optical storage medium, the write protection information indicating one of a plurality of write protection statuses of the optical storage medium and is selectable between each of the plurality of write protection statuses; and
   reproducing the data from a data zone of the optical storage medium in which user data is recorded and performing defect management on the reproduced data according to the reproduced write protection information by recording replacement data in a non-write protected area to replace data recorded in a defective area within a write protected area of the data zone.

2. The method of claim 1, wherein the reproducing the write protection information comprises detecting a set of bits and determining from the set of bits one or more areas that are write protected on the medium and whether defect management is to be performed.

3. The method of claim 1, wherein the write protection information is selectable to indicate and distinguish between each of the following states:
   a first status for permanently write-protecting all areas and in which write protection is applied to the lead-in area and the data zone, entirely;
   a second status for providing write protection while permitting defect management in which write protection is not applied to the lead-in area and areas of the data zone used for defect management, and is applied to remaining areas of the data zone not used for the defect management;
   a third status for providing write protection information without permitting defect management in which write protection is not applied to a portion of the lead-in area and is applied to the data zone and a remaining portion of the lead in area; and
   a fourth status for normal recording in which write protection is not applied to the lead-in area and the data zone, entirely.

4. The method of claim 3, wherein the reproducing the data from the data zone comprises, if the reproduced write protection information indicates the first status, reproducing the data without performing defect management.

5. The method of claim 3, wherein the reproducing the data from the data zone comprises, if the reproduced write protection information indicates the second status reproducing the data while performing defect management by recording defect management information in a rewritable portion of the lead-in area and recording data otherwise reproduced in a defective area of the data zone in a rewritable portion of the data zone designated as a replacement area.

6. The method of claim 3, wherein the reproducing the data from the data zone comprises, if the reproduced write protection information indicates the third status, reproducing the data without performing defect management with respect to the data zone.

7. The method of claim 6, wherein, when the reproduced write protection information indicates the third status, rewriting the write protection information to have the second status so as to perform defect management.

8. The method of claim 7, wherein the reproducing the data from the data zone comprises, if the reproduced write protection information is rewritten to indicate the second status, reproducing the data while performing defect management by recording defect management information in a rewritable portion of the lead-in area and recording data otherwise reproduced in a defective area of the data zone in a rewritable portion of the data zone designated as a replacement area.

9. The method of claim 3, wherein, when the write protection information indicates the fourth status, determining the optical recording medium to not be write protected.

10. The method of claim 1, wherein the lead-in area includes a disc identification zone, and the reproducing the write protection information comprises reproducing the write protection information from the disc identification zone.

11. At least one computer readable medium encoded with processing instructions for at least one computer to implement the method of claim 1.

12. A method of reproducing data from an optical storage medium, the method comprising:
   reproducing write protection information from a lead-in area of the optical storage medium, the write protection information being selectable between a first state and a second state;
   recognizing a portion of the lead-in area as being write protected if the write protection information is in the first state and as not being write protected if the write protection information is in the second state; and
   reproducing the data from a data zone of the optical storage medium in which user data is recorded and performing defect management on the reproduced data according to the reproduced write protection information by recording replacement data in a non-write protected area to replace data recorded in a defective area within a write protected area of the data zone when the write protection information is in the second state and allows defect management of a write protected data zone.

13. The method of claim 12, wherein the reproducing of the data from a data zone comprises, when the write protection information is in the second state, recognizing the data zone as being entirely write protected such that the defect management is not performed in the data zone.

14. The method of claim 12, wherein the reproducing of the data from a data zone comprises, when the write protection information is in the second state, recognizing a user data portion of the data zone as being entirely write protected such that the defect management is to be performed in a portion of the data zone which is not write protected.

15. The method of claim 14, wherein the reproducing of the data from a data zone further comprises, when the write protection information is in the second state, detecting a defect during the reproduction of the data and performing the defect management to account for the defect by writing data corresponding to a defective area of the data zone in a spare area of the data zone and writing corresponding defect management information in the lead-in area.

16. At least one computer readable medium encoded with processing instructions for at least one computer to implement the method of claim 12.

17. A method of reproducing data from an optical storage medium, the method comprising:
reproducing write protection information from a lead-in area of the optical storage medium, the write protection information indicating that a user data area of the optical storage medium is write protected; and
reproducing the data from the user data area and performing defect management on the reproduced data according to the reproduced write protection information by recording replacement data in a non-write protected area to replace data recorded in a defective area within a write protected area of the user data area.

18. The method of claim 17, wherein:
the user data area that is write protected is included in a data zone having a spare area,
the write protection information indicates that a portion of the lead-in area is not write protected and the spare area is not write protected, and
the reproducing the data comprises performing the defect management using the non-write protected portions of the lead-in area and the spare area.

19. The method of claim 18, further comprising rewriting the write protection information to indicate that the spare area is write protected to prevent performing additional defect management using the spare area.

20. At least one computer readable medium encoded with processing instructions for at least one computer to implement the method of claim 17.

21. A method of recording information on and/or reproducing information from an optical storage medium including a lead-in area, a data zone in which user data is recorded, and a lead-out area, the method comprising:
reproducing write protection information from the optical storage medium, which indicates one of a plurality of write protection statuses of the optical storage medium, the one of the statuses being to allow defect management of a write protected optical storage medium by recording replacement data in a non-write protected area to replace data recorded in a defective area within a write protected area of the data zone.

22. A method of recording data on and/or reproducing data from an optical storage medium including a lead-in area, a data zone, and a lead-out area the method comprising:
reproducing write protection information from the optical storage medium, which indicates one of a plurality of write protection statuses of the optical storage medium, one of the statuses being to allow defect management of a write protected optical storage medium by recording replacement data in a non-write protected area to replace data recorded in a defective area within a write protected area of the data zone;
recording information on the optical storage medium on a position of a defect area appearing during reproduction of the data in a memory built in a drive;
after completing the reproduction of the data, copying the data recorded in the defect area into a predetermined area of the data zone using the position information of the defect area recorded in the memory if the write protection information indicates that the write protection status allows defect management; and
recording the position information of the defect area and information on the position of the predetermined area of the data zone into which the data recorded in the defect area has been copied if the write protection information indicates that the write protection status allows defect management.

23. A reproducing apparatus for use in reproducing data from an optical storage medium having a lead-in area having write protection information and a data zone having user data, the apparatus comprising:
an optical pickup to reproduce the data from the lead-in area and the data zone; and
a controller to
control the optical pickup
to reproduce the data,
to detect the write protection information reproduced from the lead-in area, the write protection information indicating one of a plurality of write protection statuses of the optical storage medium and being selectable between each of the plurality of write protection statuses, and
to reproduce the data from the data zone of the optical storage medium and perform defect management on the reproduced data according to the reproduced write protection information by recording replacement data in a non-write protected area to replace data recorded in a defective area within a write protected area of the data zone.

24. The reproducing apparatus of claim 23, wherein the controller, while reproducing the write protection information, detects a set of bits and determines from the set of bits one or more areas that are write protected on the medium and whether defect management is to be performed.

25. A reproducing apparatus for use in reproducing data from an optical storage medium having a lead-in area having write protection information and a data zone having user data, the apparatus comprising:
an optical pickup to reproduce the data from the lead-in area and the data zone; and
a controller to
control the optical pickup to reproduce the data, to reproduce the write protection information from the lead-in area, the write protection information being selectable between a first state and a second state,
recognize a portion of the lead-in area as being write protected if the write protection information is in the first state and as not being write protected if the write protection information is in the second state, and reproduce the user data from the data zone of the optical storage medium and perform defect management on the reproduced user data according to the reproduced write protection information by recording replacement data in a non-write protected area to replace data recorded in a defective area within a write protected area of the data zone when the write protection information is in the second state and allows defect management of a write protected data zone.

26. The reproducing apparatus of claim 25, wherein, when the write protection information is in the second state, the controller further recognizes the data zone as being entirely write protected and does not perform the defect management in the data zone.

27. The reproducing apparatus of claim 25, wherein, when the write protection information is in the second state, the controller further recognizes a user data portion of the data zone as being entirely write protected, and performs the defect management on a portion of the data zone which is not write protected.

28. The reproducing apparatus of claim 27, wherein, when the write protection information is in the second state, the controller detects a defect during reproduction of the data and performs the defect management to account for the defect by writing data corresponding to a defective area of the data zone in a spare area of the data zone and writing corresponding defect management information in the lead-in area.

29. A reproducing apparatus for use in reproducing data from an optical storage medium having a lead-in area having write protection information and a data zone having user data, the apparatus comprising:

an optical pickup to reproduce the data from the lead-in area and the data zone; and a controller to control the optical pickup to reproduce the data, to reproduce the write protection information from the lead-in area, the write protection information indicating that a user data area of the optical storage medium is write protected, and to reproduce the data from the user data area and perform defect management on the reproduced data according to the reproduced write protection information by recording replacement data in a non-write protected area to replace data recorded in a defective area within a write protected area of the data zone.

30. A reproducing apparatus for use in reproducing data from an optical storage medium having a lead-in area, a data zone in which user data is recorded, and a lead-out area, the apparatus comprising:

an optical pickup to reproduce the data from the optical storage medium; and a controller to control the optical pickup to reproduce the data, and to reproduce write protection information which indicates one of a plurality of write protection statuses of the optical storage medium, one of the statuses which can be indicated by the write protection information being to allow defect management of a write protected optical storage medium by recording replacement data in a non-write protected area to replace data recorded in a defective area within a write protected area of the data zone.

31. A reproducing apparatus for use in reproducing data from an optical storage medium having a lead-in area, a data zone, and a lead-out area, the apparatus comprising:

an optical pickup to reproduce the data from the optical storage medium;

a memory; and a controller to control the optical pickup to reproduce the data, reproduce write protection information which indicates one of a plurality of write protection statuses of the optical storage medium, one of the statuses being to allow defect management of a write protected optical storage medium by recording replacement data in a non-write protected area to replace data recorded in a defective area within a write protected area of the data zone, record information on a position of a defect area appearing during reproduction of the data in the memory, after completing the reproduction of the data, copying the data recorded in the defect area into a predetermined area of the data zone using the position information of the defect area recorded in the memory if the write protection information indicates that the write protection status allows defect management, and record the position information of the defect area and information on the position of the predetermined area of the data zone into which the data recorded in the defect area has been copied if the write protection information indicates that the write protection status allows defect management.

* * * * *